United States Patent [19]
McGrath

[11] Patent Number: 6,029,956
[45] Date of Patent: Feb. 29, 2000

[54] PREDOMINANTLY LIQUID FILLED VAPOR-LIQUID CHEMICAL REACTOR

[75] Inventor: Michael John McGrath, Washington Township, N.J.

[73] Assignee: Foster Wheeler USA Corporation, Clinton, N.J.

[21] Appl. No.: 09/019,890

[22] Filed: Feb. 6, 1998

[51] Int. Cl.[7] .................................................. B01F 3/04
[52] U.S. Cl. .................................... 261/114.1; 261/114.5
[58] Field of Search ................................ 261/108, 114.1, 261/114.2, 114.3, 114.4, 114.5

[56] References Cited

U.S. PATENT DOCUMENTS

| | | | |
|---|---|---|---|
| 1,776,032 | 9/1930 | Kobernik | 261/114.2 |
| 2,698,746 | 1/1955 | Reynolds | 261/114.1 |
| 2,787,453 | 4/1957 | Hibshman et al. | 261/114.3 |
| 3,143,482 | 8/1964 | McLeod et al. | 261/114.1 |
| 3,464,679 | 9/1969 | Becker | 261/114.1 |
| 3,920,750 | 11/1975 | Katzen et al. | 260/600 A |
| 4,247,387 | 1/1981 | Akbar | 208/106 |
| 4,547,326 | 10/1985 | Weiler | 261/114.1 |
| 4,668,494 | 5/1987 | Van Hook | 423/392 |
| 4,784,069 | 11/1988 | Stark | 110/211 |
| 4,816,191 | 3/1989 | Berven et al. | 261/97 |
| 4,915,061 | 4/1990 | Garcia-Mallol | 122/4 D |
| 5,024,684 | 6/1991 | Tank | 55/92 |
| 5,218,932 | 6/1993 | Abdulally | 122/4 D |
| 5,269,976 | 12/1993 | Biddulph et al. | 261/114.1 |
| 5,325,823 | 7/1994 | Garcia-Mallol | 122/4 D |
| 5,349,813 | 9/1994 | Eisinger | 60/39.511 |
| 5,489,202 | 2/1996 | Eisinger | 431/114 |
| 5,491,967 | 2/1996 | Isaksson | 60/39.02 |
| 5,500,195 | 3/1996 | Garcia-Mallol | 423/240 R |
| 5,526,775 | 6/1996 | Hyppanen | 122/235 |
| 5,567,228 | 10/1996 | Abdulally | 95/109 |
| 5,582,515 | 12/1996 | Eisinger et al. | 431/1 |
| 5,601,039 | 2/1997 | Hyppanen | 110/245 |
| 5,601,788 | 2/1997 | Hyppanen et al. | 422/147 |
| 5,888,460 | 3/1999 | Zardi et al. | 422/193 |

FOREIGN PATENT DOCUMENTS

PCT/US99/02471  2/1999  WIPO.

*Primary Examiner*—David A. Simmons
*Assistant Examiner*—Robert A. Hopkins
*Attorney, Agent, or Firm*—Jenkens & Gilchrist, P.C.

[57] ABSTRACT

A predominantly liquid filled, vapor-liquid chemical reactor having an improved distributor plate assembly is disclosed. At least one of the plates in the assembly is formed with an active area having a plurality of apertures formed through the plate, an opening, and a downwardly depending lip proximate the opening. As vapor ascends through the reactor, the plate and the lip cooperate to trap the vapor upwardly against the bottom of the plate, forming a vapor region. This vapor region facilitates vapor liquid interaction and the flow pattern of liquid through the reactor.

5 Claims, 7 Drawing Sheets

PREDOMINANTLY LIQUID FILLED VAPOR-LIQUID CHEMICAL REACTOR

FIELD OF THE INVENTION

The present invention pertains to vapor-liquid chemical reactors and, more particularly, but not by way of limitation, to improved apparatus and methods for increasing the efficiency of mass and/or energy transfer in a predominantly liquid filled, vapor-liquid chemical reactor.

HISTORY OF THE RELATED ART

Vapor-liquid chemical reactors have been utilized to carry out a chemical reaction between two or more reactants for a variety of processes. In such reactors, liquid is the largest volumetric phase. Typically, reactants are introduced and products are withdrawn simultaneously in a continuous manner. Conventional reactors use a variety of equipment for contacting the vapor and liquid reactants within the reactors, such as regular or irregular solid packing, a plurality of bubble-cap or sieve trays, an empty reactor in which liquid is sprayed, a wetted-wall reactor, stirring means to mechanically agitate the reactants, or sparging means to agitate the reactants.

The processes typically performed in vapor-liquid chemical reactors can generally be divided into two categories, gas absorption and gas stripping or desorption. Gas absorption is a process in which the soluble components of a gas mixture are dissolved in a liquid. Gas desorption is the inverse process in which the volatile components of a liquid mixture are transferred into a gas. Ordinarily, the vapor and liquid reactants are made to flow counter-currently past each other within the reactor so that the greatest rate of absorption, or desorption, is obtained. In gas absorption, the product is an inert, nonvolatile solvent, and in gas desorption, the product is an inert, nonsoluble gas. uccessful reaction of the components is dependent on facilitating as intimate contact between the vapor and liquid phases as possible within the reactor. Such contact improves the efficiency and quantity of the mass and/or energy transfer between the liquid and vapor.

Some conventional co-current flow, predominately liquid filled, vapor-liquid chemical reactors do not utilize trays. However, in such reactors, vapor tends to quickly rise up the center of the reactor and then leaves at the top of the reactor, entraining a portion of the liquid which did not have adequate time to complete the desired reaction with the vapor. The quickly rising vapor in the center of such reactors also causes liquid to recirculate downwardly at the periphery of the reactor in a "vapor deficient zone", leading to undesirable condensation or polymerization reactions.

As mentioned above, some conventional vapor-liquid chemical reactors utilize mechanical agitators to improve contact between the vapor and liquid phases. However, such agitators are prohibitively expensive for large diameter reactors, especially such reactors that operate in severe environments.

A completely different type of system, vapor-liquid chemical process towers or columns, have been utilized to perform a variety of fractionation or distillation processes. In such systems, the vapor is the largest volumetric phase. Distillation differs from gas absorption in that it involves the separation of components based on the distribution of the various substances between a gas phase and a liquid phase when all the components are present in both phases. In distillation, the product is generated from the original feed mixture by vaporization or condensation of the volatile components.

Conventional distillation columns utilize either trays, packing, or combinations of each. In recent years, the trend in such columns has been to replace the so-called "bubble caps" by sieve and valve trays in most tray column designs. Additionally, random (dumped) or structured packings have been utilized in combination with the trays in order to effect improved separation of the components in the stream. Successful fractionation in the column is dependent upon intimate contact between liquid and vapor phases. Such contact improves the efficiency and quantity of the mass and/or energy transfer between the liquid and vapor occurring in the column.

Fractionation column trays generally consist of a solid tray or deck having a plurality of apertures and at least one vertical channel providing a flow path between trays for the liquid phase. Vapor ascends through the apertures and contacts the liquid moving across the tray, through the "active" area thereof. In the active area, liquid and vapor mix and fractionation occurs. The descending liquid is directed onto a tray by means of a vertical channel from the tray above. This channel is referred to as the inlet downcomer. The liquid moves across the lower tray and exits through a similar channel referred to as the exit downcomer. The location of the downcomers determines the flow pattern of the liquid. The technology of counter-current flow chemical process columns is replete with various tray, tray downcomer, and packing designs, and the types of trays, downcomer, and packing employed in a process column are functions of the specific process to be effected within the column.

Notwithstanding the above-described efforts, a need exists in the industry to improve the efficiency and quantity of the mass and/or energy transfer between the liquid and vapor phases in predominantly liquid filled, vapor-liquid chemical reactors, and to overcome the above-described problems in such conventional chemical reactors. The present invention addresses this need by utilizing a plurality of distributor plates disposed within a vapor-liquid chemical reactor. The distributor plates of the present invention have an active area with a plurality of apertures allowing for the percolation of an ascending, dispersed vapor phase and at least one opening allowing for the passage of an ascending or descending, continuous liquid phase. The distributor plates also have a lip proximate the opening that helps to create a vapor seal along the bottom surfaces of the plates. The vapor seal facilitates the upward percolation of vapor and the desired flow of the liquid across the plates within the reactor.

SUMMARY OF THE INVENTION

The present invention pertains to improved apparatus and methods for increasing the efficiency of mass and/or energy transfer in a predominantly liquid filled, vapor-liquid chemical reactor. More particularly, one aspect of the present invention comprises a distributor plate assembly for a predominantly liquid filled, vapor-liquid chemical reactor. The distributor plate assembly includes a first distributor plate disposed within the reactor. The first distributor plate comprises an active area having a plurality of apertures formed through the plate, an opening, and a downwardly depending lip proximate the opening. The first distributor plate and the lip are adapted to trap ascending vapor upwardly against a bottom surface of the first distributor plate. The lip may have a lower end with a plurality of serrations, and the serrations may have a saw-tooth geometry. In addition, the upper surface of the first distributor plate may be downwardly sloped toward the center of the reactor, and the apertures in the active area may be louvered toward the center of the reactor.

In another aspect, the present invention comprises a predominantly liquid filled, vapor-liquid chemical reactor. The reactor has a vessel and a first distributor plate disposed within the vessel. The first distributor plate comprises an active area having a plurality of apertures formed through the first plate, an opening, and a downwardly depending lip proximate the opening. The first distributor plate and the lip are adapted to trap ascending vapor upwardly against a bottom surface of the first distributor plate. During operation of the reactor, ascending vapor is trapped against the bottom surface of the first distributor plate and the lip to form a vapor region, and the vapor region has sufficient pressure so as to prevent liquid from flowing into the region and through the apertures of the plate. Vapor flows from the vapor region through the apertures, and is dispersed into the liquid above the plate. The lip may have a lower end with a plurality of serrations, and the serrations may also disperse vapor from the vapor region into liquid flowing through the opening.

In another aspect, the present invention comprises a method of interacting a vapor and a liquid through a region of a predominantly liquid filled, vapor-liquid chemical reactor of the type wherein the vapor and liquid are ascending in the tower in co-current flow. A first distributor plate is formed in the reactor. The first distributor plate comprises an active area having a plurality of apertures formed through the plate, an opening, and a downwardly depending lip proximate the opening. A vapor and a liquid are introduced into the reactor below the first distributor plate. A vapor region is formed below the first distributor plate and bounded by the lip so that the vapor region has sufficient pressure to prevent liquid from flowing upwardly into the region and through the apertures in the plate. The vapor region disperses vapor bubbles through the apertures and into the flow of liquid across the top surface of the first distributor plate. The bottom edge of the lip may also comprise serrations, and vapor may be dispersed from the vapor region, through the serrations, and into the flow of liquid through the opening.

In a further aspect, the present invention comprises a method of interacting a vapor and a liquid through a region of a predominantly liquid filled, vapor-liquid chemical reactor of the type wherein the vapor is ascending and the liquid is descending in the reactor in counter-current flow. A first distributor plate is formed in the reactor. The distributor plate comprises an active area having a plurality of apertures formed through the plate, an opening, and a downwardly depending lip proximate the opening. A vapor is introduced into the reactor below the first distributor plate, and a liquid is introduced into the reactor above the plate. A vapor region is formed below the first distributor plate and bounded by the lip so that the vapor region has sufficient pressure to prevent liquid from flowing downwardly through the apertures of the plate and into the region. The vapor region disperses vapor bubbles through the apertures and into the flow of liquid across the top surface of the first distributor plate. The bottom edge of the lip may also comprise serrations, and vapor may be dispersed from the vapor region, through the serrations, and into the flow of liquid through the opening.

BRIEF DESCRIPTION OF THE DRAWINGS

For a more complete understanding of the present invention, and for further objects and advantages thereof, reference is made to the following description taken in conjunction with the accompanying drawings in which.

DETAILED DESCRIPTION OF THE PREFERRED EMBODIMENTS

The preferred embodiments of the present invention and their advantages are best understood by referring to FIGS. 1–5 of the drawings, like numerals being used for like and corresponding parts of the various drawings.

Figure 1:
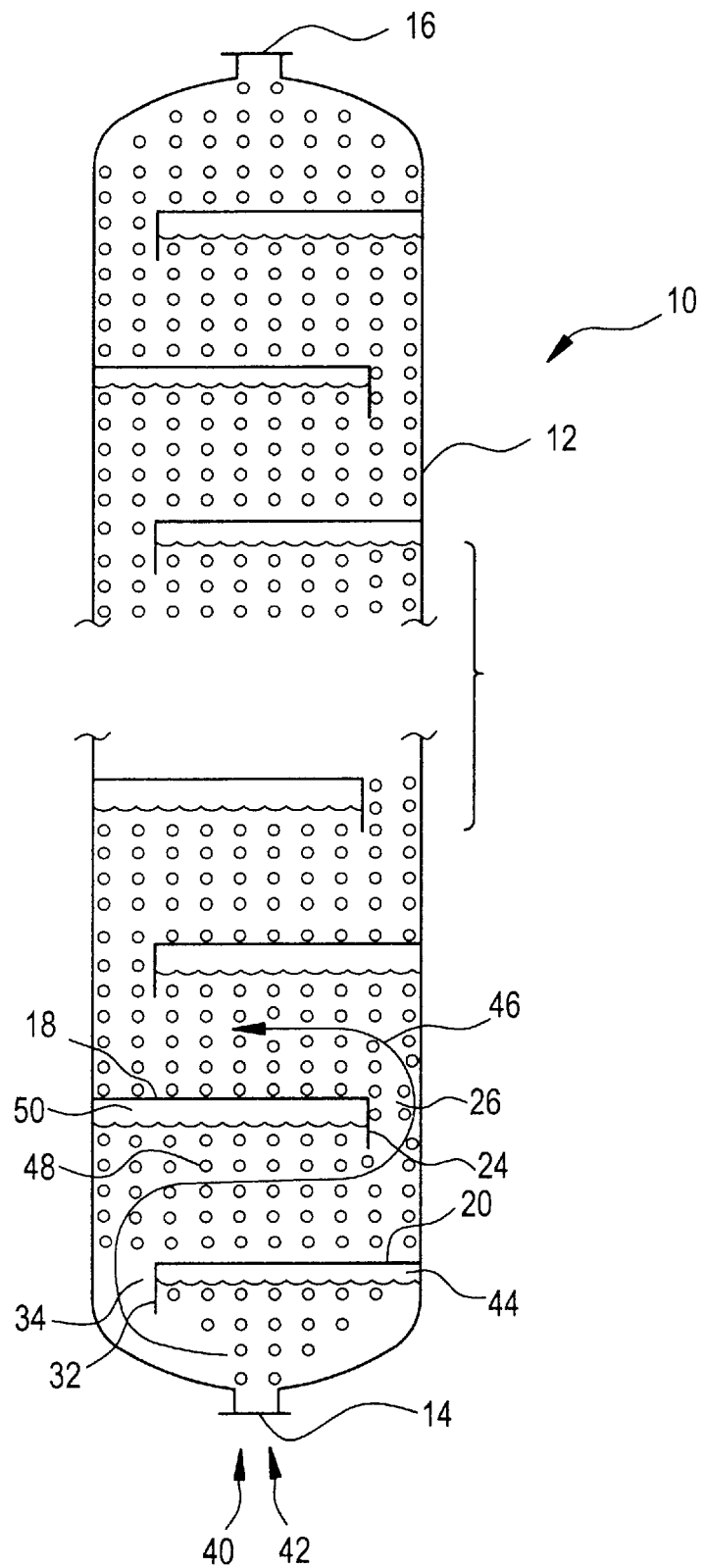
FIG. 1 is a schematic, cross-sectional view of a vapor-liquid chemical reactor having a distributor plate assembly according to a first, preferred embodiment of the present invention and illustrating the co-current flow of a vapor and a liquid therein.

Referring first to FIG. 1, a schematic, cross-sectional view of a vapor-liquid chemical reactor having a distributor plate assembly according to a first, preferred embodiment of the present invention is illustrated. A vapor-liquid chemical reactor 10 comprises a generally cylindrical vessel 12 having an inlet 14 on its bottom side and an outlet 16 on its top side. Reactor 10 is preferably predominantly liquid filled. Vessel 12 has a plurality of distributor plates disposed therein, two of which, distributor plate 18 and distributor plate 20, are numbered for illustration. The distributor plates of reactor 10 are preferably horizontal. Although not shown in FIG. 1 for the purpose of clarity, vessel 12 may have a variety of other structures, such as packing bed layers, manways for facilitating access to the internal region of vessel 12, side stream draw off lines, additional liquid and vapor feed lines, or other conventional chemical reactor structures.

Figure 2:
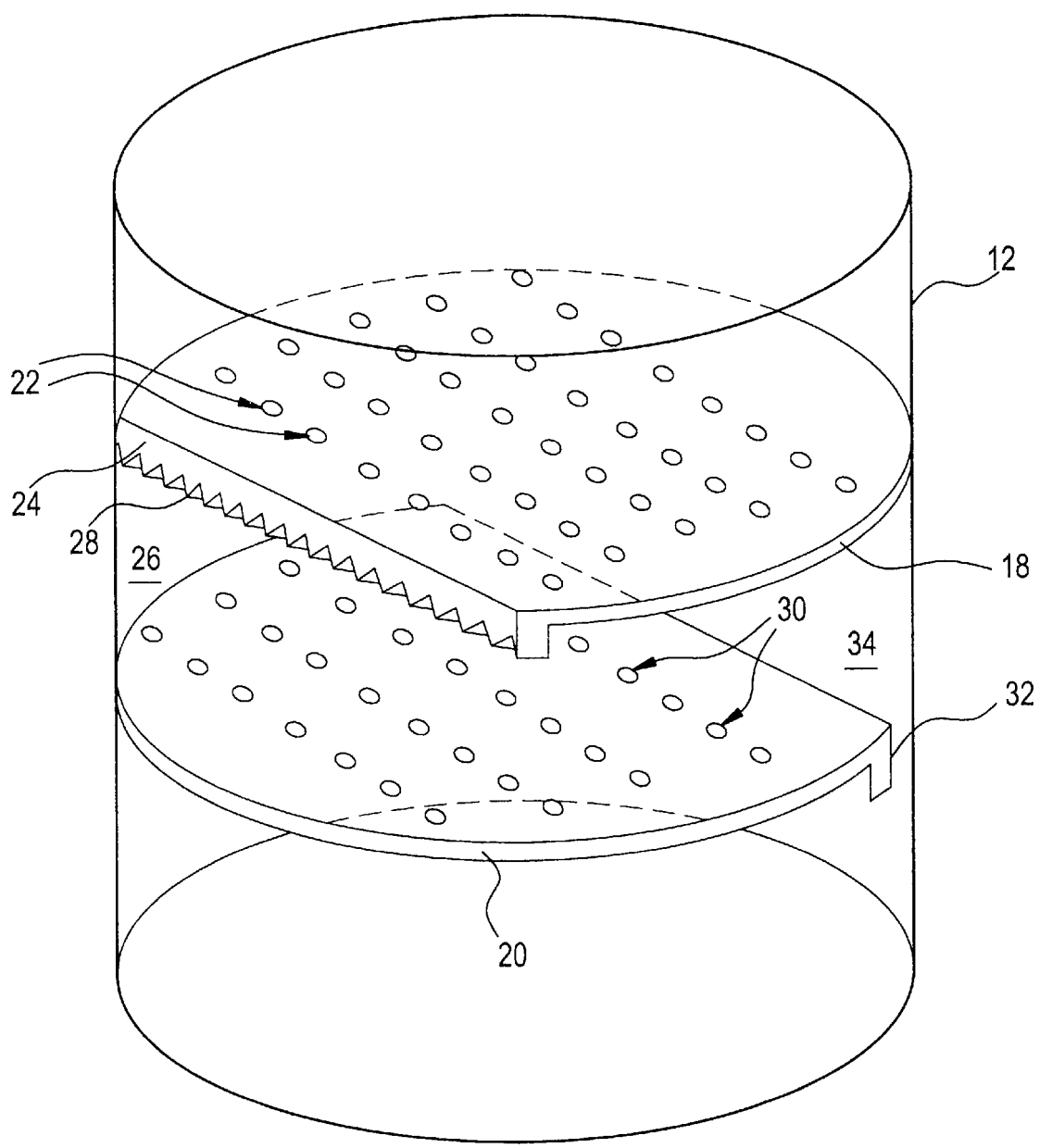
FIG. 2 is a schematic, perspective, fragmentary view of the distributor plate assembly of FIG. 1.

Referring next to FIG. 2, a schematic, perspective, fragmentary view of distributor plates 18 and 20 within vessel 12 is shown. An active area comprising an array of apertures 22 is formed through distributor plate 18. Apertures 22 are preferably holes passing through plate 18, but apertures 22 may also comprise valve structures for certain applications of reactor 10. A chordal opening 26 preferably truncates plate 18 short of the inner wall of vessel 12. A lip 24 extends downwardly from a bottom surface of plate 18 proximate opening 26. Lip 24 has a greater thickness than the remainder of plate 18, and serration s 28 are preferably formed on the lower end of lip 24. As shown in FIG. 2, serrations 28 are preferably formed as "saw tooth" serrations, but serrations 28 may also be formed as "square-tooth" serrations or serrations with an alternative cross-sectional shape.

An active area comprising an array of apertures 30 is formed through distributor plate 20. Apertures 30 are preferably holes passing through plate 20, but apertures 30 may also comprise valve structures for certain applications of reactor 10. A chordal opening 34 preferably truncates plate 20 short of the inner wall of vessel 12. Opening 34 is preferably on the opposite side of vessel 12 than opening 26. A lip 32 extends downwardly from a bottom surface of plate 20 proximate opening 34. Lip 32 has a greater thickness than the remainder of plate 20 and, although not visible in FIG. 2, has serrations on its lower end similar to serrations 28 of distributor plate 18.

The number, size, and spacing of apertures 22 and 30 depends on a variety of factors, including the specific chemical process being performed in reactor 10, the vapor flow rate within reactor 10, and the relative densities of the vapor and liquid. As shown best in FIG. 1, the active area of a given distributor plate preferably extends to the area of the given plate below the opening in the distributor plate positioned immediately above the given plate. Alternatively, the active areas of the distributor plates may not extend to such areas for certain applications of reactor 10. As also shown best in FIG. 1., the remaining distributor plates in vessel 12 preferably have a similar structure to plates 18 and 20. Although seven distributor plates are shown in FIG. 1, this number is for illustration only, and the specific number of plates required is dependent on the process being run in reactor 10.

Referring to FIGS. 1 and 2, in co-current flow operation of reactor 10, a vapor 40 and a liquid 42 enter vessel 12 from inlet 14. Both vapor 40 and liquid 42 ascend through vessel 12, interacting along and through the plurality of distributor plates located therein. An example of a chemical reaction that may be advantageously performed using co-current flow operation of reactor 10 is a reaction system in which a heavy petroleum oil is reacted with a vapor phase hydrogen source in the presence of a catalyst at a temperature above 700° F. to produce a lighter density petroleum product.

As vapor 40 enters inlet 14, plate 20 and its associated lip 32 cooperate to trap vapor 40 upwardly against plate 20, creating a vapor region 44 having sufficient pressure to prevent liquid 42 from flowing upwardly into the region and through apertures 30. Vapor region 44 displaces liquid 42 that would normally flow into the region, allowing vapor 40 to percolate or bubble through apertures 30 and into the area above plate 20. Vapor region 44 also causes the majority of liquid 42 to flow horizontally around plate 20, upwardly through opening 34, and into the area above plate 20, as indicated by arrow 46. Above plate 20, vapor bubbles 48 are dispersed within flowing liquid 42, improving the mass and/or energy transfer between vapor 40 and liquid 42. In addition, any amount of vapor 40 that does not pass through apertures 30 flows through the serrations located on the lower end of lip 32. In this manner, excess vapor is also dispersed into flowing liquid 42 with improved mass and/or energy transfer. As mentioned above, the serrations located on the lower end of lip 32 are preferably saw tooth serrations because this geometry tends to maximize the dispersion of vapor flowing through the serrations. In addition, lip 32, as well as all other lips formed on the distributor plates of vessel 12, preferably have the smallest height possible that allows vapor to coalesce into vapor regions on the bottom of the distributor plates.

As vapor 40 ascends above plate 20, plate 18 and its associated lip 24 cooperate to trap vapor 40 upwardly against plate 18, creating a vapor region 50 similar to vapor region 44 beneath plate 20. As one skilled in the art may appreciate, the above-described interaction between vapor 40 and liquid 42 repeats itself for each additional plate added to vessel 12 above plate 18. For most processes using co-current flow operation of reactor 10, the flow rates of vapor 40 and liquid 42 are preferably such that the distributor plate design causes liquid 42 to flow through substantially the entire region between adjacent distributor plates, with the exception of the vapor regions below each of the distributor plates. Of course, for some processes using co-current flow operation of reactor 10, there will be some liquid entrained with the vapor, and therefore liquid 42 may only flow through a portion of the region between adjacent distributor plates.

Figure 3:
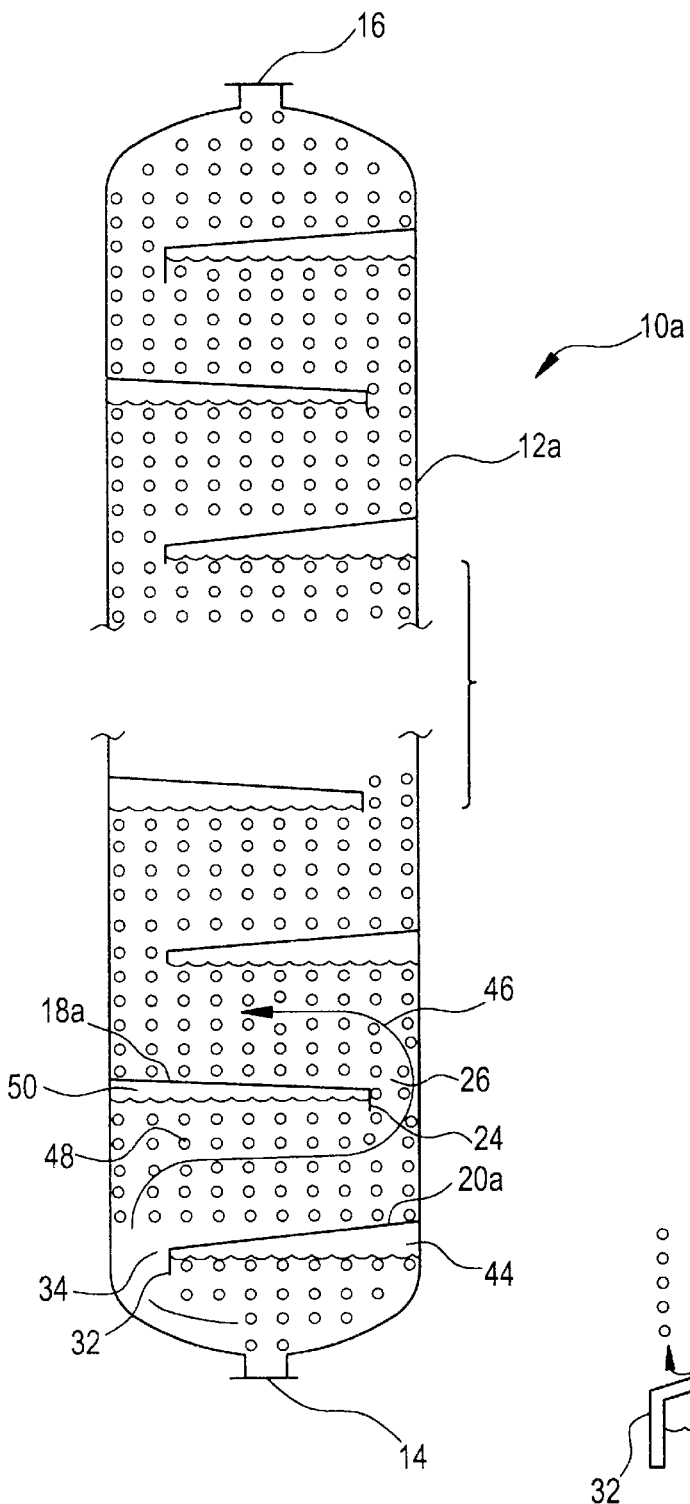
FIG. 3 is a schematic, cross-sectional view of a vapor-liquid chemical reactor having a distributor plate assembly according to a second, preferred embodiment of the present invention and illustrating the co-current flow of a vapor and a liquid therein.
Figure 4:
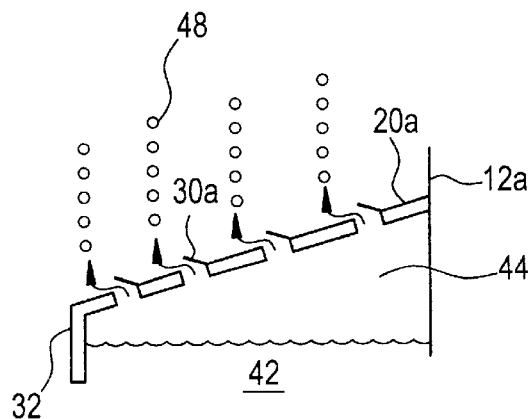
FIG. 4 is an enlarged, fragmentary view of one of the distributor plates of the distributor plate assembly of FIG. 3.

Referring next to FIG. 3, a schematic, cross-sectional view of a vapor-liquid chemical reactor having a distributor plate assembly according to a second, preferred embodiment of the present invention is illustrated. Similar to reactor 10, a vapor-liquid chemical reactor 10a comprises a generally cylindrical vessel 12a having an inlet 14 on its bottom side and an outlet 16 on its top side. Vessel 12a is preferably substantially identical in structure to vessel 12 of reactor 10. Reactor 10a is preferably predominantly liquid filled. Vessel 12 has a plurality of distributor plates disposed therein, two of which, plate 18a and plate 20a, are numbered for illustration.

The structure and operation of plates 18a and 20a are substantially similar to plates 18 and 20 of reactor 10, respectively, with two important exceptions. First, plates 18a and 20a have an upper surface that is sloped downwardly toward the center of vessel 12a. When solids such as catalysts or byproducts of the reaction are present in vessel 12a, such sloping causes any solids that settle on the plates to flow to the bottom of vessel 12a where they can be removed or remixed with liquid. Second, as is shown by the example of apertures 30a of plate 20a in FIG. 4, it is also preferred that the apertures of plates 18a and 20a be louvered toward the center of vessel 12a. Such louvering directs the flow of vapor in a manner that enhances the flow of solids across and down the plates toward the bottom of vessel 12a.

Figure 5:
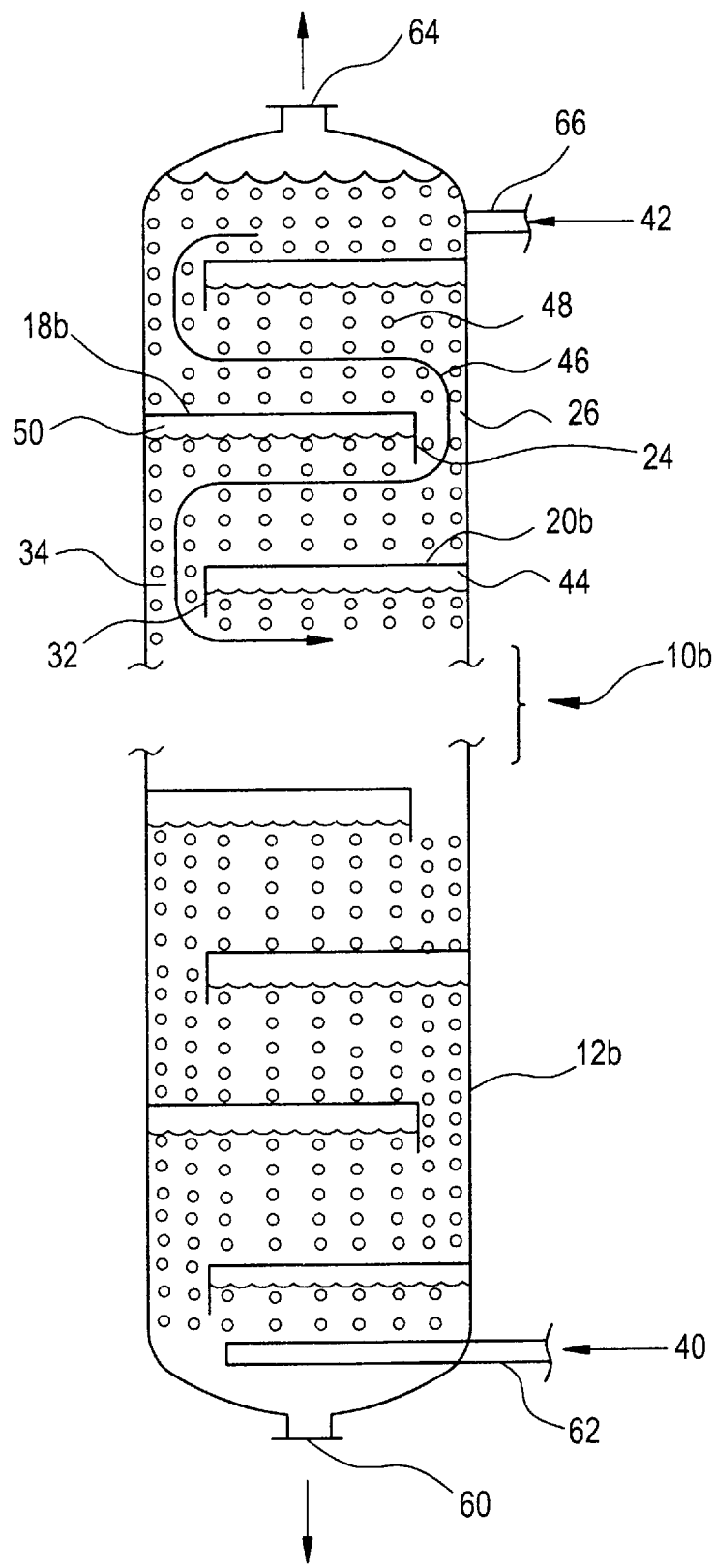
FIG. 5 is a schematic, cross-sectional view of a vapor-liquid chemical reactor having a distributor plate assembly according to a third, preferred embodiment of the present invention and illustrating the counter-current flow of a vapor and a liquid therein.

Referring next to FIG. 5, a schematic, cross-sectional view of a vapor-liquid chemical reactor having a distributor plate assembly according to a third, preferred embodiment of the present invention illustrating counter-current flow operation is shown. Reactor 10b comprises a generally cylindrical vessel 12b having a liquid outlet 60 and a vapor feed line 62 on its bottom side, and a vapor outlet 64 and a liquid feed line 66 on its top side. The structure of vessel 12b is preferably substantially similar to the structure of vessel 12 of reactor 10. Reactor 10b is preferably predominantly liquid filled.

Vessel 12b further has a plurality of distributor plates disposed therein, two of which, plate 18b and plate 20b, are numbered for illustration. The structure of plates 18b and 20b are substantially similar to the structure of plates 18 and 20 of reactor 10. In addition, although not shown in FIG. 5, plates 18b and 20b may also be formed with a structure substantially similar to plates 18a and 20a of reactor 10a when solids such as catalysts or byproducts of the reaction are present in vessel 12b. However, contrary to distributor plates 18 and 20 and distributor plates 18a and 20a, the active area of a given distributor plate in reactor 10b preferably does not extend to the area of the given plate below the opening in the distributor plate positioned immediately above the given plate, especially in reactors 10b exhibiting high vapor flow rates. Alternatively, the active areas of the distributor plates may extend into such areas for certain applications of reactor 10b.

Referring to FIGS. 2 and 5, in counter-current flow operation of reactor 10b, vapor 40 enters vessel 12b from vapor feed line 62 and flows upwardly through the distributor plates of vessel 12b, ultimately exiting via vapor outlet 64. Liquid 42 enters vessel 12b from liquid feed line 66 and flows downwardly, around the distributor plates of vessel 12b and through the openings in each of the distributor plates, ultimately exiting through liquid outlet 60. As vapor 40 and liquid 42 flow through vessel 12b, they interact along and through the plurality of distributor plates located therein, as is described in more detail below.

Plate 18b and its associated lip 24 cooperate to trap ascending vapor 40 upwardly against the bottom of plate 18b, creating a vapor region 50 having sufficient pressure to prevent liquid 42 from flowing downwardly into the region and through apertures 22. Vapor region 50 displaces liquid 42 that would normally flow into the region, allowing vapor 40 to percolate or bubble through apertures 22 and into the area above plate 18b. Vapor region 50 also causes the majority of liquid 42 to flow horizontally around plate 18b, downwardly through opening 26, and into the area below plate 18b, as indicated by arrow 46. Above plate 18b, vapor bubbles 48 are dispersed within flowing liquid 42, improving the mass and/or energy transfer between vapor 40 and liquid 42. In addition, any amount of vapor 40 that does not pass through apertures 22 flows through the serrations 28 located on the lower end of lip 24. In this manner, excess vapor is also dispersed into flowing liquid 42 with improved mass and/or energy transfer. As mentioned above, serrations 28 are preferably saw tooth serrations because this geometry tends to maximize the dispersion of vapor flowing through the serrations. In addition, lip 24, as well as all other lips formed on the distributor plates in vessel 12b, preferably have the smallest height possible that allows vapor to coalesce into vapor regions on the bottom of the distributor plates.

Similarly, plate 20b and its associated lip 32 cooperate to trap vapor 40 upwardly against plate 20, creating a vapor region 44 similar to vapor region 50 beneath plate 18. As one skilled in the art may appreciate, the above-described interaction between vapor 40 and liquid 42 repeats itself for each additional plate in vessel 12b. For most processes using counter-current flow operation of reactor 10b, the flow rates of vapor 40 and liquid 42 are preferably such that the distributor plate design causes liquid 42 to flow through substantially the entire region between adjacent distributor plates, with the exception of the vapor regions below each of the distributor plates. Of course, for some processes using counter-current flow operation of reactor 10b, there will be some liquid entrained with the vapor, and therefore liquid 42 may only flow through a portion of the region between adjacent distributor plates.

From the above, it may be appreciated that present invention provides a vapor-liquid chemical reactor having a distributor plate assembly yielding improved efficiency and quantity of the mass and/or energy transfer between the liquid and vapor phases in the reactor. The plate assembly of the present invention eliminates or substantially reduces interaction problems typical in some conventional, predominantly liquid filled, vapor-liquid chemical reactors such as (1) liquid entrainment in vapor due to insufficient reaction time and (2) undesirable "vapor deficient zones" in liquid recirculating down the periphery of the reactor. The distributor plate assembly of the present invention provides these advantages without requiring mechanical agitators having moving parts and with only a minimal increase in the production costs over that of conventional vapor-liquid chemical reactors.

Figure 2A:
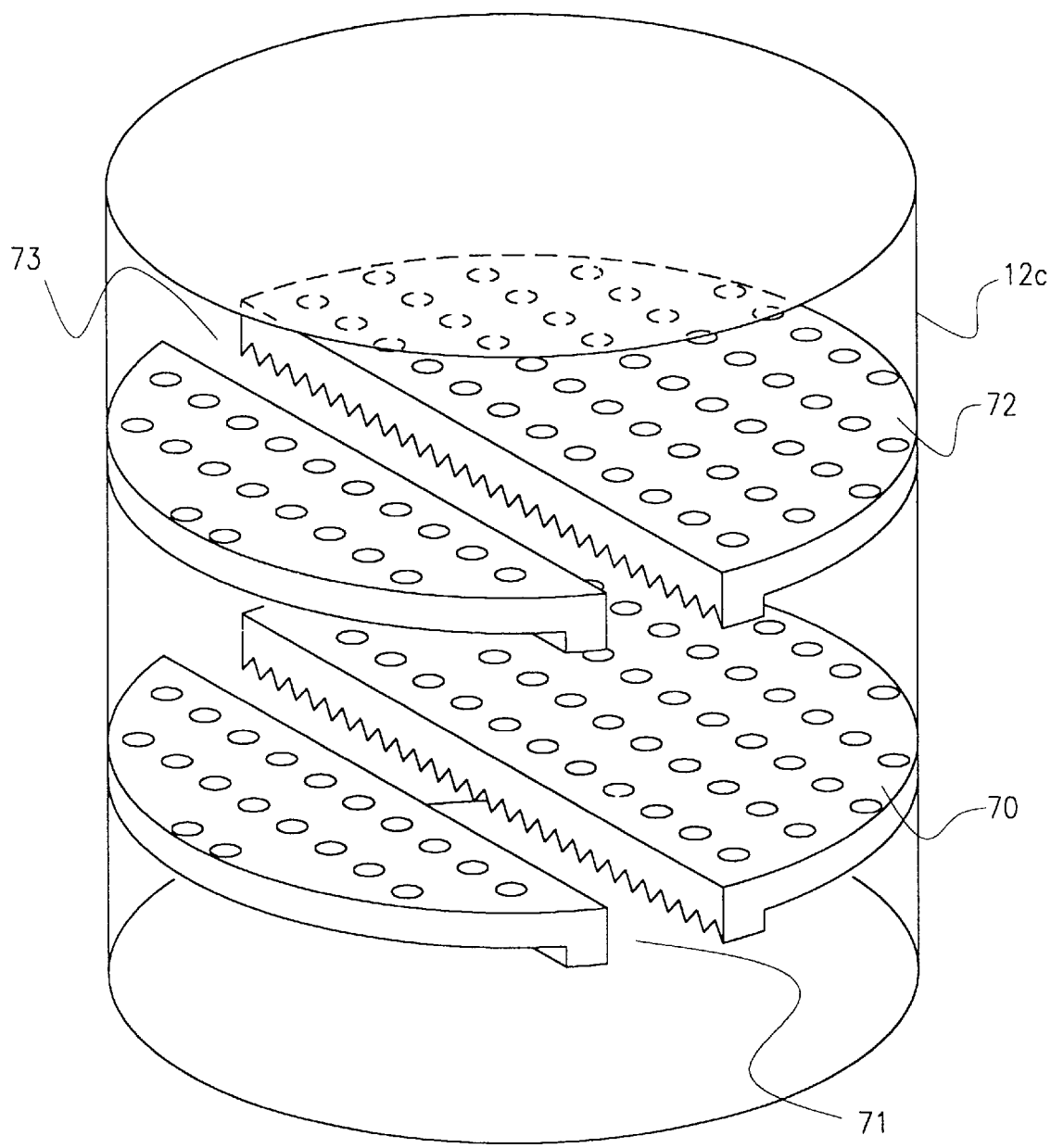
FIG. 2A is a schematic, perspective, fragmentary view of the distributor plate assembly including interior openings in the distributor plates.
Figure 2B:
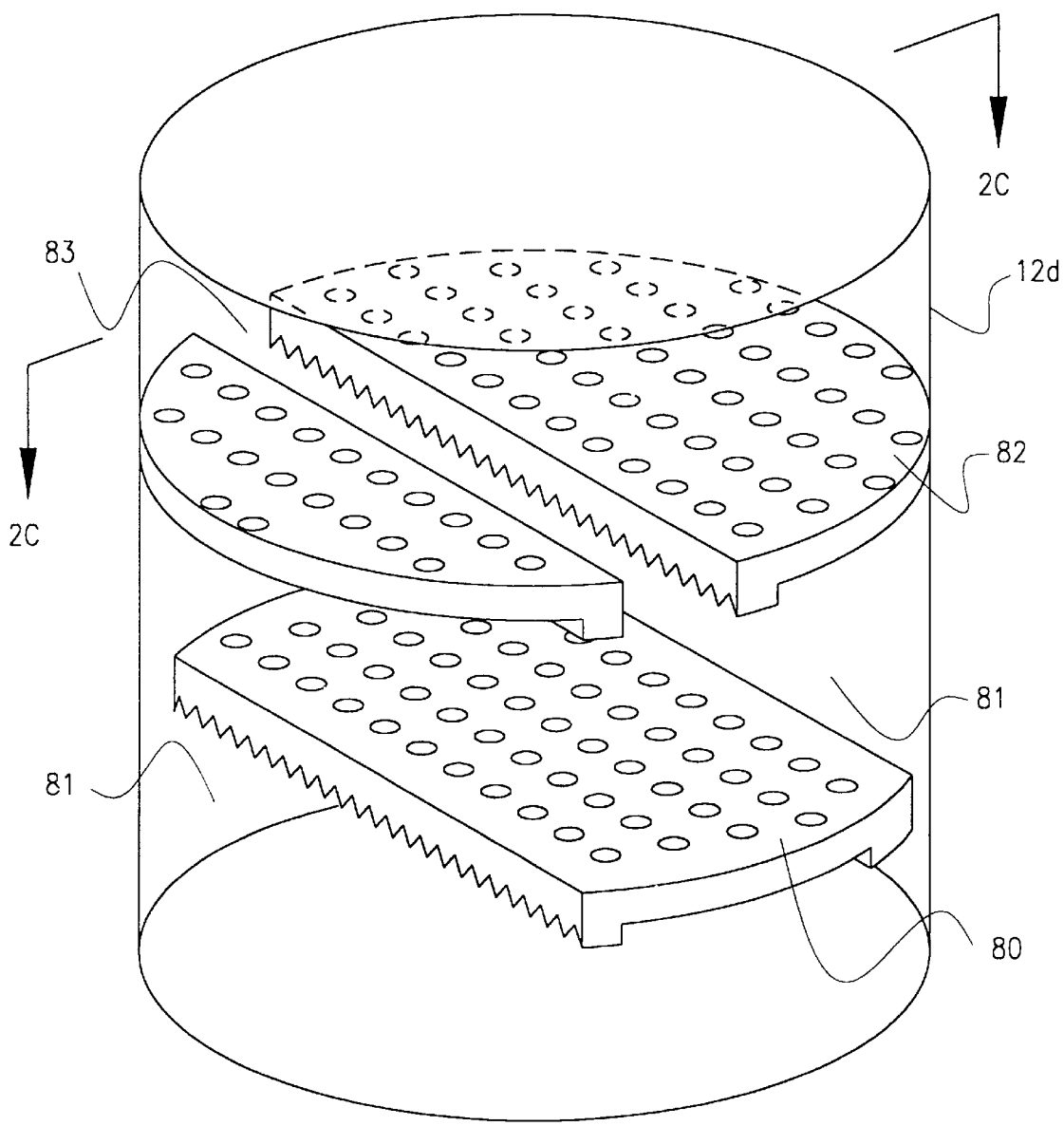
FIG. 2B is a schematic, perspective, fragmentary view of the distributor assembly showing chordal openings in one plate and a central interior opening in an adjacent plate.
Figure 2C:
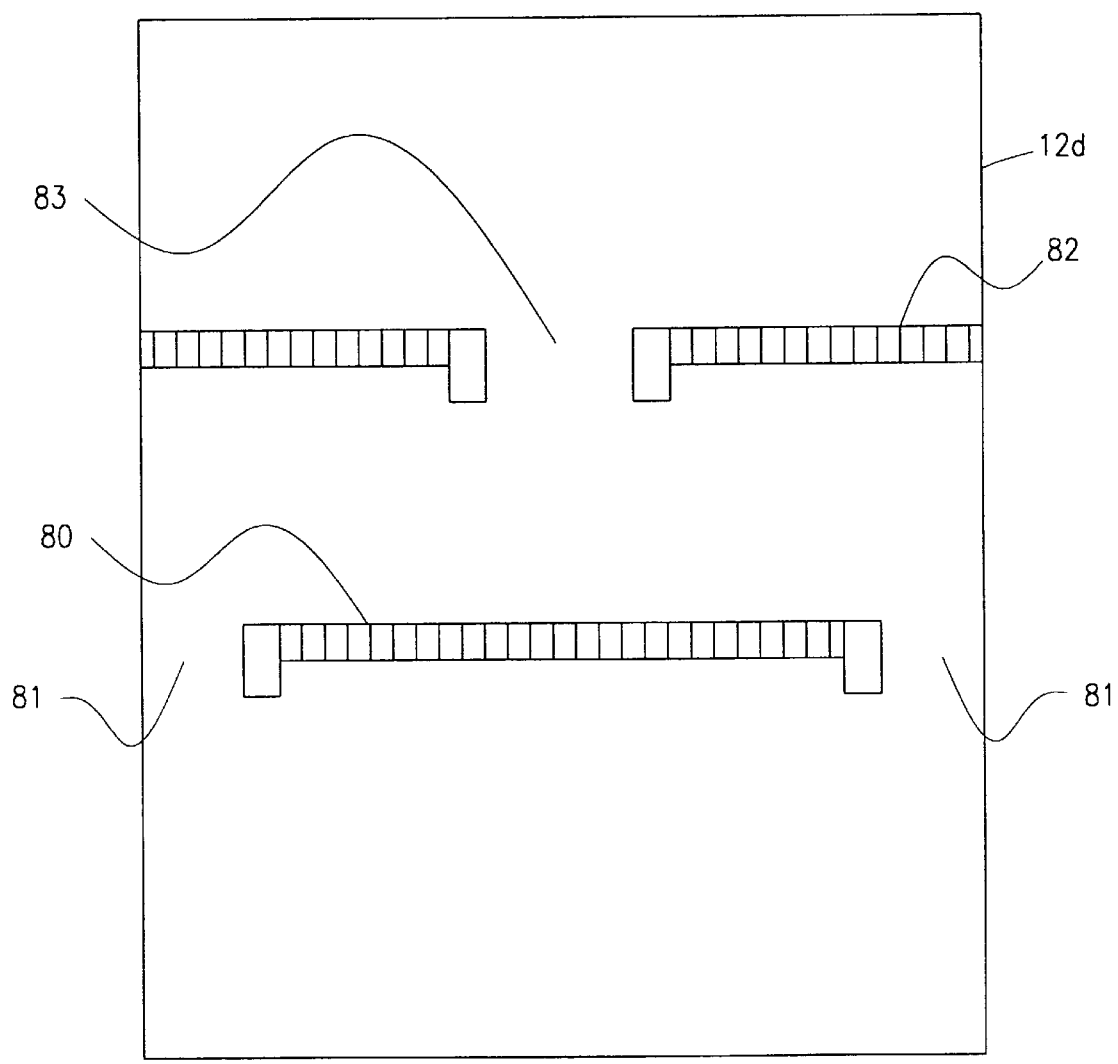
FIG. 2C, is a view in section along the line 2C—2C of FIG. 2B.

The present invention is illustrated herein by example, and various modifications may be made by a person of ordinary skill in the art. For example, numerous geometries and/or relative dimensions could be altered to accommodate specific applications of a vapor-liquid chemical reactor. In addition, although the distributor plate assembly of the present invention has been described above in connection with plates having chordal openings for the passage of a continuous, liquid phase, the present invention is fully applicable to plates having non-chordal openings, such as an opening located in the interior of a plate away from the inner wall of the vessel. As another example, the present invention is also fully applicable to a plate assembly having dual, opposing, chordal openings in a first plate and a generally central opening in a second plate disposed in the reactor proximate the first plate. Such modifications in the distributor plate assembly are shown in FIG. 2A, FIG. 2B, and FIG. 2C. Referring to FIG. 2A, a reactor 12c includes a distributor plate 70 having an internal opening 71 extending across the plate within the reactor and an identical distributor plate 72 having an internal opening 73 extending across the plate within the reactor. Each of the plates has a depending lip at the opening in the plate to trap vapor within the reactor below the plate. Referring to FIGS. 2B and 2C, a reactor 12d has a distributor plate 80 having a chordal openings 81 across the plate in the reactor and an adjacent distributor plate 82 having a central internal opening 83 extending across the plate within the reactor. In a reactor having more than two distributor plates alternate plates will include chordal openings and adjacent plates a central internal opening.

It is thus believed that the operation and construction of the present invention will be apparent from the foregoing description. While the method and apparatus shown or described have been characterized as being preferred it will be obvious that various changes and modifications may be made therein without departing from the spirit and scope of the invention as defined in the following claims.

What is claimed is:

1. A distributor plate assembly for a predominantly liquid filled, vapor-liquid chemical reactor, comprising:

a first distributor plate disposed within said reactor, comprising:

an active area having a plurality of apertures formed through said first distributor plate;

an opening in said plate; and a downwardly depending lip across said plate proximate said opening said lip having a lower end provided with a plurality of serrations located thereon;

said first distributor plate coacting with said lip to trap ascending vapor upwardly in a region against a bottom surface of said first distributor plate, said vapor in said region having sufficient pressure to exclude liquid from said region and said apertures and to disperse vapor into liquid bypassing said lip.

2. The distributor plate of claim 1 wherein said serrations in said lip across said distributor plate have a saw-tooth geometry.

3. A predominantly liquid filled, vapor-liquid chemical reactor, comprising:

a vessel; and a first distributor plate disposed within said vessel, comprising:

an active area having a plurality of apertures formed through said first distributor plate;

an opening in said plate;

a downwardly depending lip across said plate proximate said opening, said lip having a plurality of serrations located thereon;

said first distributor plate coacting with said lip to trap ascending vapor upwardly in a region against a bottom surface of said first distributor plate said region having sufficient pressure to exclude liquid from said region and said apertures;

a vapor inlet in a lower end of said reactor wherein during operation of said reactor ascending vapor is trapped across said bottom surface of said distributor plate and said lip to form said vapor region and wherein said vapor region has sufficient pressure, so as to prevent liquid from flowing into said region through said apertures; and said serrations disburse vapor from said vapor region into liquid flowing through said opening in said distributor plate.

4. A method of interacting a vapor and a liquid through a region of a predominantly liquid filled, vapor-liquid chemical reactor of the type wherein said vapor and liquid are ascending in said reactor in co-current flow, said method comprising the steps of:

forming a first distributor plate in said reactor, said first distributor plate comprising:
an active area having a plurality of apertures formed through said first distributor plate;
an opening in said plate;
a downwardly depending lip on said plate proximate said opening, said lip having serrations along a bottom edge thereof;

introducing a vapor and a liquid into said reactor below said first distributor plate;

forming a vapor region below said first distributor plate and bounded by said lip to form said vapor region, where said vapor region has sufficient pressure so as to prevent liquid from flowing upwardly into said region and through said apertures; and disbursing vapor from said vapor region through said serrations in said lip into said flow of liquid through said opening in said plate.

5. A method of interacting a vapor and a liquid through a region of a predominantly liquid filled, vapor-liquid chemical reactor of the type wherein said vapor is ascending and said liquid is descending in said reactor in counter-current flow, said method comprising the steps of:

forming a first distributor plate in said reactor, said distributor plate comprising:
an active area having a plurality of apertures formed through said distributor plate;
an opening in said plate;
a downwardly depending lip on said plate proximate said opening, said lip having serrations along a bottom edge thereof;

introducing a vapor into said reactor below said first distributor plate;

introducing a liquid into said reactor above said first distributor plate;

forming a vapor region below said first distributor plate and bounded by said lip, where said vapor region has sufficient pressure so as to prevent liquid from flowing downwardly through said apertures and into said vapor region;

flowing vapor upwardly through said apertures into said liquid above said plate; and disbursing vapor from said vapor region through said serrations past said lip into said flow of liquid through said opening in said distributor plate.

* * * * *

UNITED STATES PATENT AND TRADEMARK OFFICE
CERTIFICATE OF CORRECTION

PATENT NO. : 6,029,956
DATED : February 29, 2000
INVENTOR(S) : McGrath

It is certified that error appears in the above-identified patent and that said Letters Patent is hereby corrected as shown below:

Column 1, Line 34: Add "S" to "uccessful".

Column 8, Line 58: Add "assembly" after the word "plate".

Signed and Sealed this

Thirteenth Day of March, 2001

Attest:

NICHOLAS P. GODICI

*Attesting Officer*   *Acting Director of the United States Patent and Trademark Office*